United States Patent [19]

Wasserman

[11] Patent Number: 4,495,723
[45] Date of Patent: Jan. 29, 1985

[54] METHOD OF PREVENTING FROST DAMAGE OF VEGETATION

[75] Inventor: Kurt J. Wasserman, Westtown, N.Y.
[73] Assignee: Phase Change Technology, Inc., Port Jervis, N.Y.
[21] Appl. No.: 516,918
[22] Filed: Jul. 25, 1983
[51] Int. Cl.³ .............................................. A01G 13/00
[52] U.S. Cl. ............................................ 47/2; 165/46
[58] Field of Search ................... 47/2, 22, 23, 24, 17, 47/58; 165/46; 126/429, 400

[56] References Cited

U.S. PATENT DOCUMENTS 4,223,666  9/1980  Wasserman ..................... 126/429
4,250,958  2/1981  Wasserman ..................... 165/46

Primary Examiner—Robert A. Hafer
Assistant Examiner—Bradley M. Lewis
Attorney, Agent, or Firm—Markovits, Blustein, Gottlieb & Slobod

[57] ABSTRACT

A method of maintaining vegetation above frost damage levels in which the roots, stems, trunks or foliage of the vegetation is surrounded by a phase change material having a melting point in excess of the frost damage level, which phase change material is encased in a plurality of bags or in an elongated tubular member. In the case of use of an elongated tubular member, it may be coiled directly about the vegetation or coiled in stacks positioned above the vegetation or laid below ground in rows or coiled within the interior of an automotive tire proximate the vegetation which serves to directly collect solar energy. A fluid path is provided through the center of the tubular member which is coupled to a solar collector. The solar thermal energy collected thereby is transfered via fluid recirculating in this path to the phase change material such that the phase change material melts. When the ambient temperature falls below frost damage levels, the phase change material, upon cooling and solidifying, releases thermal energy to heat the vegetation. Alternatively, when sufficient solar energy is not available, the transfer fluid is heated by a fuel-fired furnace. In the case of use of encasement of the phase change material in a plurality of bags, these fill the toroidal interior of an automotive tire proximate the vegetation which directly collects solar thermal energy which is conducted to the encased phase change material.

19 Claims, 10 Drawing Figures

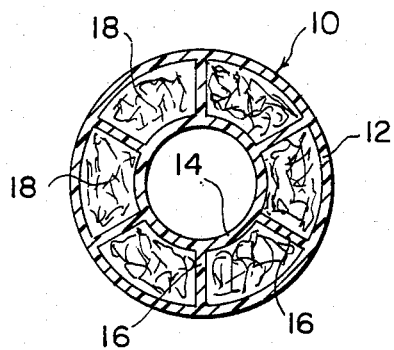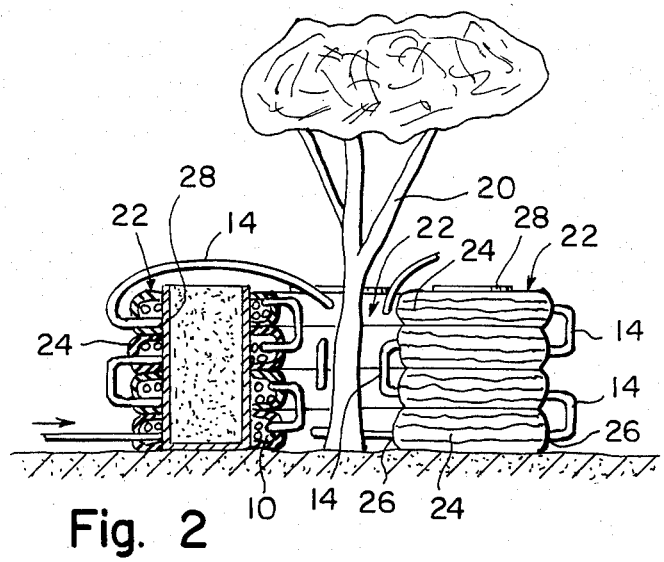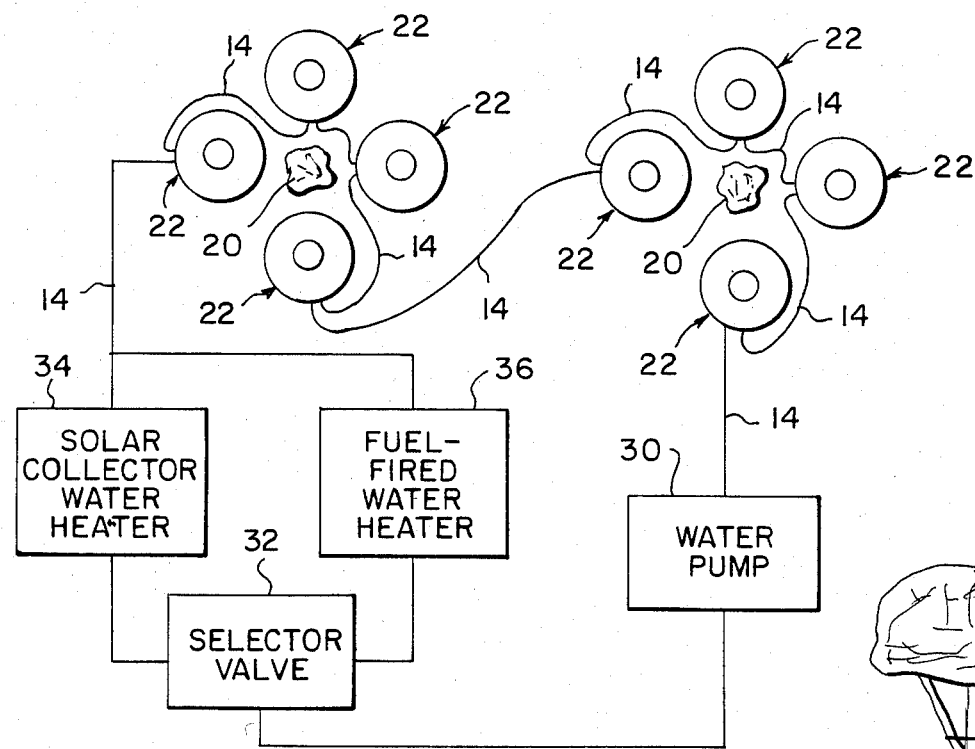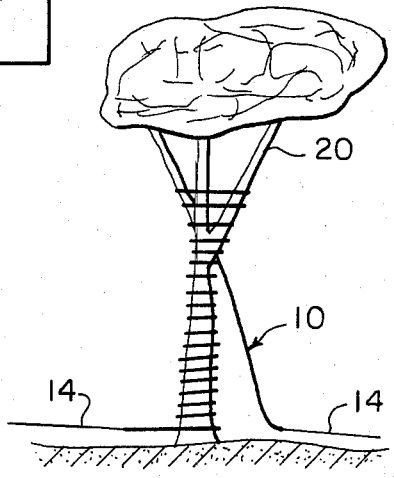
Fig. 1
Fig. 2
Fig. 3
Fig. 4

METHOD OF PREVENTING FROST DAMAGE OF VEGETATION

FIELD OF THE INVENTION

The present invention relates generally to methods of preventing frost damage to vegetation including trees, bushes and plants of all types. In its particular aspects, the present invention relates to a method of substantially surrounding vegetation with a phase change material having a melting point above the frost damage level, and heating and melting said phase change material with remotely and/or directly collected solar energy, such that upon the reduction of ambient temperature approaching frost damage levels, the phase change material releases stored thermal energy to heat the vegetation.

BACKGROUND OF THE INVENTION

Severe economic loss has heretofore been caused by frost damage of crops, such as fruit and vegetables. Previous attempts to prevent frost damage of crops have been limited to the use of smudge pots, bonfires, water spraying and air movement by fans or airplanes. While remotely collected solar energy has heretofore been used for heating water and for heating a transfer fluid to be supplied to an indoor space, I am not aware of any attempts to apply solar energy heating concepts to the maintenance of vegetation above frost damage levels. Furthermore, while tubularly encased phase change material has heretofore been suggested for thermal energy storage purposes, such as in my prior patents: U.S. Pat. No. 4,223,666 for Toroidal Solar Collection and Energy Storage Apparatus; U.S. Pat. No. 4,248,209 for Coupled Toroidal Solar Collector, granted Feb. 3, 1981; and U.S. Pat. No. 4,250,958 for Double Tubular Thermal Energy Storage Element granted Feb. 17, 1981, no suggestion has heretofore been made concerning use of such material to surround vegetation.

Similarly, my aforementioned prior patents directed to Toroidal Solar Collection and Energy Storage, while teaching the use of stacks of automotive tires as a collector of solar energy, do not deal with the purposes of the present invention.

OBJECTS OF THE INVENTION

It is an object of the present invention to provide a method of maintaining vegetation above frost damage levels in which the vegetation is substantially surrounded with an encased phase change material, and wherein solar energy is collected at a remote location and conveyed by transfer fluid to heat the phase change material.

It is a further object of the present invention to provide for maintaining the temperature of vegetation through the use of tubularly encased phase change material coiled into stacks and spaced about the vegetation.

It is yet another object of the present invention to provide for maintaining the temperature of vegetation through the use of tubularly encased phase change material which is coiled directly around the vegetation.

It is still another object of the present invention to provide rows below ground of encased phase change material to maintain the temperature of the roots of vegetation.

It is also an object of the present invention to provide encased phase change material within an automotive tire acting as a solar collector in heat transfer relationship with vegetation.

SUMMARY OF THE INVENTION

The aforementioned and other objects of the present invention are accomplished by substantially surrounding vegetation with an encased phase change material and either providing a solar collector housing said encased phase change material or providing a path for heat transfer fluid to circulate between a remote location at which solar thermal energy is collected and the phase change material, and recirculating the heat transfer fluid therebetween for the purpose of transferring collected solar thermal energy to the phase change material. As the ambient temperature about the vegetation drops below the melting point of the phase change material, the phase change material releases latent thermal energy which tends to maintain the temperature of the vegetation at the desired level above the frost damage point.

In the case of the use of remote solar energy collection, the phase change material is encased in an elongated member of tubular construction which includes the fluid path through its center. This elongated member may be arranged to substantially surround the vegetation in a variety of ways.

In one method, useful for maintaining the temperature of fruit bearing trees, the phase change material is coiled into the toroidal interior of stacked tires or tire-like members, and a plurality of such stacks are positioned around the trunk of the tree. Another method useful for trees is accomplished by coiling the encased phase change material directly around the trunk of the tree.

Techniques suitable for maintaining the temperature of small plants involve the use of an automotive tire or stack of the same which is on the ground, or in part below the ground, and positioned with the plant in the center area of the tire. The encased phase change material is coiled within the toroidal interior of the tire or tire stack. Another method useful for placing phase change material in association with small plants is the provision of encased phase change material run back and forth in parallel spaced apart paths in a meandering fashion and buried so that it lies a suitable distance below ground to be in heat transfer relationship with the roots of rows of plants.

In the case of use of direct solar collection, the phase change material is encased in packages such as bags which fill the toroidal interior of an automotive tire that is directly heated by the sun. Such tires may be stacked proximate vegetation or may be positioned with the vegetation passing through the center of the tire.

Other objects, features and advantages of the present invention will become apparent upon perusal of the following detailed description of the preferred embodiments of the present invention, when taken in conjunction with the appended drawing.

BRIEF DESCRIPTION OF THE DRAWING

FIG. 1 is a transverse cross-sectional view of encased phase change material used in conjunction with various of the inventive methods;

FIG. 2 is an elevational view of one embodiment of the invention in conjunction with a tree;

FIG. 3 is a top view of a plurality of the embodiments of FIG. 1 in conjunction with a schematic representation;

FIG. 4 is an elevational view of another embodiment of the present invention in conjunction with a tree;

DETAILED DESCRIPTION OF THE PREFERRED EMBODIMENTS

Figure 5:
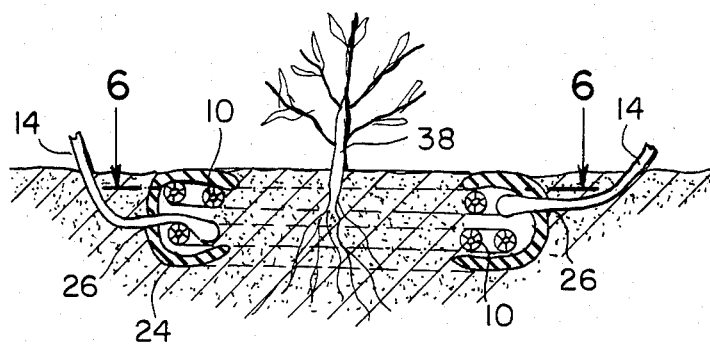
FIG. 5 is an elevational cross-sectional view of another embodiment of the present invention in conjunction with a plant.

The present invention relates to methods of utilization of encased phase change material in proximity to trees, plants and other vegetation for the purpose of maintaining the temperature of the vegetation above injurious levels. Frost damage temperatures for plants are generally at on slightly above the freezing point of water. Since it is desired to transfer solar thermal energy collected at a remote location to the phase change material, the double tubular thermal energy storage element disclosed in U.S. Pat. No. 4,250,958 issued to the applicant herein on Feb. 17, 1981, which is incorporated by reference, is believed to be the most appropriate element for use in the methods of the present invention.

The double tubular thermal energy storage element 10 is shown in transverse cross-section in FIG. 1. It comprises an elongated tubular flexible plastic or elastomeric element having an outside tubular wall 12, an inside tubular wall 14, and a plurality of angularly spaced apart radially directed integral webs 16 maintaining walls 12 and 14 in coaxial relationship. The annular space between tubular walls 12 and 14 is filled with phase change material 18 as of salt hydrate having a heat of fusion in excess of 50 BTU per pound and a melting point selected from the range of 45 to 75 degrees Fahrenheit. The inner tubular wall 14 forms a conduit for heat transfer fluid so that heat may be transfered from the fluid to the phase change material 18 by conduction through wall 14. The annular space between walls 12 and 14 may be sealed at opposite ends of an extended length of double tubular element 10, allowing the element to be placed in series with an ordinary conduit for heat transfer fluid. Thus, for the purposes of understanding the drawing, ordinary conduit coupled to the interior of the inner tube 14 of double tubular element 10 shall also be designated by the reference numeral "14".

Now, referring to FIGS. 2 and 3 of the drawing, there are shown fruit trees 20 with a plurality of vertical stacks 22 of automotive tires 24 or other similar black elastomeric toroidal members spaced angularly apart about the base of the trees and positioned so that rising heat from stacks 22 will warm the foliage. Within the toroidal interior of each tire is coiled several turns of a double tubular element 10. The ends of each element 10 exits the tire 22 via holes 26 cut in the tire tread wall and these ends are serially interconnected by conduits 14 to form a series path for heat transfer fluid running through each double tubular element within each tire 24 of each stack 22. At the center of each stack 22 may be placed drums 28 filled with stone, water or other thermal storage material which in addition to providing additional thermal storage capacity serves as an aid to maintaining the tire 24 in coaxial relationship. During sunlit hours, the tires 24 also absorb direct solar radiant energy which is conducted to the phase change material 18.

As is apparent from FIG. 3 the conduits 14 of a plurality of stacks 22 surrounding a plurality of trees 20 may be coupled together in series to form a path for heat transfer fluid flow throughout an entire orchard. This heat transfer fluid path may be fed by a water pump 30. The series path is completed via selector valve 32 which selectively couples either remotely located solar collector water heater 34 or a fuel-fired water heater 36 into the path.

The method of the present invention should now be apparent in which solar thermal energy is collected by solar collector 34 and heats the transfer fluid that is continually recirculated through the double tubular element 10 within stacks 22 to transfer the collected thermal energy to phase change material 18 so that the collected thermal energy is stored in the phase change material as latent heat. Consequently, when the ambient temperature around trees 20 drops below the melting point of the phase change material 18, thereby approaching the front damage temperature, this heat is given up to warm the foliage of the trees.

Since the double tubular element 10 is sufficiently flexible to be coiled directly about the trunk of tree so as shown in FIG. 4, the stacks 22 in FIG. 3 may be replaced by this configuration.

Figure 6:
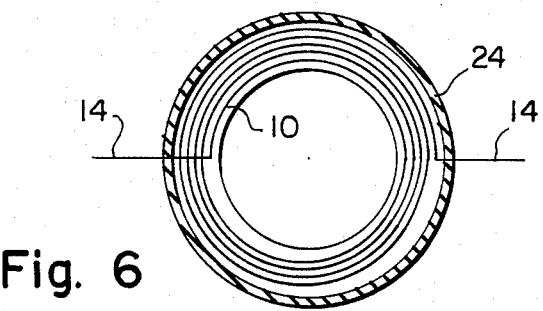
FIG. 6 is a cross-sectional top view taken through the lines 6—6 in FIG. 5.
Figure 7:
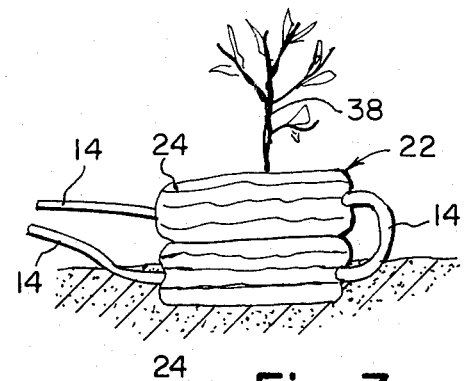
FIG. 7 is an elevational view of another embodiment of the present invention in conjunction with a plant.

For use in maintaining the temperature of small plants 38 the configuration of FIGS. 5 and 6 is useful. Therein, a tire 24 is buried just below ground level and the double tubular element 10 is again coiled within the toroidial interior of the tire 24, with input and output conduits 14 exiting the tire through holes 26 in the tread wall. The plant 38 including its root structure, is located in the earth within the hollow center of the tire 24, which earth is maintained at suitably high temperature by double tubular element 10. To also permit some direct collection of the solar thermal energy at the site of plant 38, the configuration of FIG. 7 may be utilized which comprises a stack of two tires 24 the double tubular elements 10 coiled in each tire are serially interconnected in the same manner as in FIG. 2, but with the plant in the center of the tires in the same manner as in FIG. 5.

Figure 8:
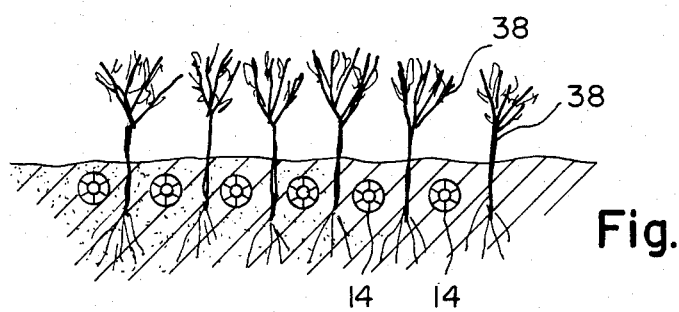
FIG. 8 is an elevational cross-sectional view of another embodiment of the present invention in conjunction with a plurality of plants.
Figure 9:
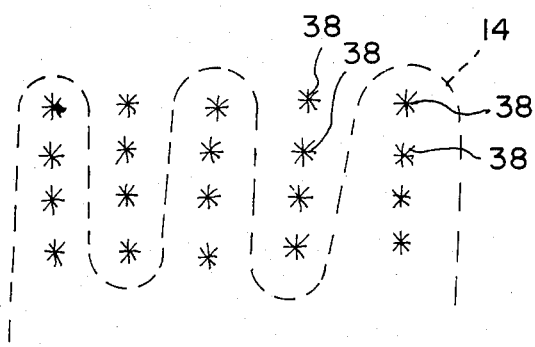
FIG. 9 is a top view of the embodiment in FIG. 8.

Rather than coiling the double tubular element 14, it may be placed several inches underground meandering back and forth in parallel spaced apart runs as shown in FIGS. 8 and 9 with rows of plants 38 between the parallel runs. The element 14 is in heat transfer relationship with the roots of plants 38.

The various configurations shown are illustrative that there is a great variety of arrangements of the double tubular element 10 to substantially surround the vegetation that is to be maintained in temperature.

Figure 10:
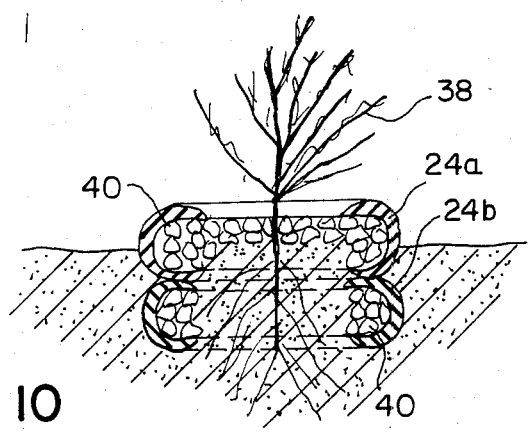
FIG. 10 is an elevational cross sectional of another embodiment of the present invention in conjunction with a plant.

Referring to FIG. 10, there is illustrated a method for maintaining the temperature of the small plant 38 not involving remote collection of solar thermal energy but rather utilizing the direct solar radiant energy collection ability of the automotive tire 24. Therein a pair of stacked tires are provided with the bottom tire 24b entirely below ground and the top tire 24a half above and half below ground. The plant 38 lies in the center of the stack such that the bottom tire 24b is in close proximity with the root structure of the plant. The toridal interiors of tires 24a and 24b are filled with small bags 40 as of thin walled flexible polyethylene, or other plastic or elastomeric material, in which are sealed the phase change material 18. Solar radiant energy directly falling upon the top of tire 24a is conducted via tire 24a to tire 24b and to the phase change material within the bags 40 in each of the tires. Consequently the directly collected solar radiant energy provides latent heat to the phase change material which may be released to plant 38 upon the ambient temperature falling below the melting point of phase change material 18.

It should be appreciated while the various embodiments of the present invention have been described in specific detail, numerous additions, ommissions and modifications are possible within the intended spirit and scope of the invention.

What is claimed is:

1. The method of maintaining vegetation above the frost damage temperature level associated with the particular vegetation comprising the steps of:
   a. in an outdoor environment, substantially surrounding said vegetation with an encased phase change material having a melting point in excess of the frost damage temperature for the vegetation, said phase change material being in heat transfer proximity to said vegetation;
   b. providing a path for heat transfer fluid to circulate between a location remote from the vegetation and a location in heat transfer relationship with said phase change material;
   c. collecting solar thermal energy, when available, at said remote location;
   d. heating said fluid at said remote location with said collected thermal energy to a temperature in excess of said melting point;
   e. recirculating said heated fluid along said path for a sufficient time to melt said phase change material with thermal energy from said fluid; and
   f. heating said vegetation with thermal energy released by said phase change material in response to ambient temperature dropping below said melting point.

2. The method of claim 1 wherein said phase change material is encased in an elongated tubular member.

3. The method of claim 2 wherein said substantially surrounding of said vegetation by said encased phase change material comprises the step of coiling said elongated tubular member about said vegetation.

4. The method of claim 2 wherein said vegetation is substantially surrounded by said phase change material by the step of forming said elongated tubular member into a plurality of coiled stacks and the step of placing the stacks spaced apart about the vegetation.

5. The method of claim 4 wherein said forming of said tubular member into stacks comprises the steps of coiling said tubular member into the toroidal interiors of a plurality of tire-like members and vertically stacking said tire-like members.

6. The method of claim 3 wherein said coiling of said tubular member is accomplished by coiling said tubular member into the toroidal interior of a tire-like member.

7. The method of claim 2 wherein said vegetation is substantially surrounded by said phase change material by forming a plurality of substantially parallel runs of said tubular members below ground.

8. The method of claim 2 wherein said vegetation comprises a tree and said surrounding of said vegetation comprises the step of coiling the tubular member around the trunk of the tree.

9. The method of claim 1 wherein said substantially surrounding of said vegetation is done below ground level.

10. The method of claim 1 further comprising the additional steps of providing said fluid path to extend to an additional remote location proximate a fuel-fired heater, and selectively heating said fluid with said fuel-fired heater.

11. The method of maintaining vegetation above the frost damage level associated with the particular vegetation comprising the steps of:
   a. in an outdoor environment, positioning a substantially black housing proximate to and in heat transfer relationship with the vegetation and in position to directly receive solar radiant energy;
   b. substantially packing the interior of said housing with encased phase change material having a melting point in excess of the frost damage temperature for said vegetation;
   c. collecting solar radiant energy directly falling on said housing;
   d. heating said encased phase change material by conduction of said collected solar radiant energy to a temperature in excess of said melting point; and
   e. heating said vegetation with thermal energy released by said phase change material in response to ambient temperature dropping below said melting point.

12. The method of claim 11 wherein the positioning step comprises the positioning of a plurality of substantially black hollow toroidal tire-like members in a vertical stack proximate to and in heat transfer relationship with the vegetation said stack being in position to directly receive solar radiant energy and wherein said packing step comprises the packing of the toroidal interior of each tire-like member of said stack with said encased phase change material.

13. The method of claim 11 wherein said housing is a toroidal tire-like member and said vegetation is in the center of said tire-like member.

14. The method of claim 12 wherein said vegetation is in the center of said stack.

15. The method of claim 11, wherein said housing is a toroidal tire-like member and said encased phase change material comprises an elongated tubular member coiled within said tire-like member.

16. The method of claim 12 wherein said encased phase change material comprises an elongated tubular member coiled within each tire-like member of said stack.

17. The method of claim 11 wherein said encased phase change material comprises a plurality of bags of phase change material.

18. The method of claim 12 wherein said encased phase change material comprises a plurality of bags of phase change material.

19. The method of claim 14 wherein at least one tire-like member of said stack is entirely below ground.

* * * * *